(12) United States Patent
Kandala

(10) Patent No.: US 7,450,922 B2
(45) Date of Patent: Nov. 11, 2008

(54) DATA UNIT DETECTION INCLUDING ANTENNA DIVERSITY

(75) Inventor: Srinivas Kandala, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 302 days.

(21) Appl. No.: 11/006,855

(22) Filed: Dec. 7, 2004

(65) Prior Publication Data

US 2005/0096001 A1    May 5, 2005

Related U.S. Application Data

(63) Continuation of application No. 10/337,551, filed on Jan. 6, 2003, now Pat. No. 6,856,795, which is a continuation of application No. 09/510,907, filed on Feb. 23, 2000, now Pat. No. 6,505,307.

(60) Provisional application No. 60/141,419, filed on Jun. 29, 1999.

(51) Int. Cl.
*H04B 7/00* (2006.01)
*H04B 1/06* (2006.01)

(52) U.S. Cl. .............. 455/277.2; 455/232.1; 455/245.1; 342/437; 342/445

(58) Field of Classification Search .............. 485/277.2, 485/232.1, 245.1, 234.1, 240.1, 250.1, 101, 485/136, 182.2, 269; 343/725, 729; 342/437, 342/445, 52, 57
See application file for complete search history.

(56) References Cited

U.S. PATENT DOCUMENTS

| | | | |
|---|---|---|---|
| 3,909,735 A | 9/1975 | Anderson et al. | |
| 3,980,945 A | 9/1976 | Bickford | |
| 4,070,714 A | 1/1978 | Bishton, Jr. et al. | |
| 4,101,738 A | 7/1978 | Bellangu et al. | |
| 4,245,325 A | 1/1981 | Kikuchi et al. | |
| 4,547,850 A | 10/1985 | Genma | |
| 4,660,215 A | 4/1987 | Horiike et al. | |
| 4,661,902 A | 4/1987 | Hochsprung et al. | |
| 4,682,117 A | 7/1987 | Gibson | |
| 4,773,085 A | 9/1988 | Cordell | |
| 4,816,820 A | 3/1989 | Davis | |
| 4,882,619 A | 11/1989 | Hasegawa et al. | |
| 4,884,139 A | 11/1989 | Pommier | |

(Continued)

OTHER PUBLICATIONS

Part II: Wireless LAN Medium Access Control (MAC) and Physical Layer (PHY) Specifications: High-speed Physical Layer in the 5 GHZ Band; IEE Std 802.11a-1999, 91 pages.

*Primary Examiner*—Tony T Nguyen
(74) *Attorney, Agent, or Firm*—Chernoff, Vilhauer, McClung & Stenzel

(57) ABSTRACT

A system adjusts a receiving device in response to sensing symbols. An automatic gain control is adjusted in response to receiving a first symbol of a data unit from a first antenna. After adjusting the automatic gain control at least a second and a third symbol of the data unit are received. The automatic gain control in response to receiving a fourth symbol of the data unit from a second antenna is received. After adjusting the automatic gain control at least a fifth and a sixth symbol of the data unit is received. At least one of the first and second antenna is selected based upon a function of a first and second energy, calculated using the second and third symbol, and the fifth and sixth symbol, respectively.

17 Claims, 4 Drawing Sheets

U.S. PATENT DOCUMENTS

| | | |
|---|---|---|
| 4,910,794 A | 3/1990 | Mahany |
| 4,969,717 A | 11/1990 | Mallinson |
| 5,012,469 A | 4/1991 | Sardana |
| 5,029,183 A | 7/1991 | Tymes |
| 5,063,547 A | 11/1991 | Custers et al. |
| 5,063,574 A | 11/1991 | Moose |
| 5,070,536 A | 12/1991 | Mahany et al. |
| 5,077,753 A | 12/1991 | Grau, Jr. et al. |
| 5,086,426 A | 2/1992 | Tsukakoshi et al. |
| 5,091,795 A | 2/1992 | Nishioka et al. |
| 5,134,516 A | 7/1992 | Lehureau et al. |
| 5,134,630 A | 7/1992 | Bateman |
| 5,136,580 A | 8/1992 | Videlock et al. |
| 5,160,900 A | 11/1992 | Visuri |
| 5,166,924 A | 11/1992 | Moose |
| 5,179,555 A | 1/1993 | Videlock et al. |
| 5,191,576 A | 3/1993 | Pommier et al. |
| 5,197,061 A | 3/1993 | Halbert-Lassalle |
| 5,201,071 A | 4/1993 | Webb |
| 5,209,183 A | 5/1993 | Sampson |
| 5,210,770 A | 5/1993 | Rice |
| 5,228,025 A | 7/1993 | Le Floch et al. |
| 5,231,634 A | 7/1993 | Giles et al. |
| 5,267,271 A | 11/1993 | Rice |
| 5,283,780 A | 2/1994 | Schuchman et al. |
| 5,313,169 A | 5/1994 | Fouche et al. |
| 5,343,498 A | 8/1994 | Toy et al. |
| 5,345,440 A | 9/1994 | Gledhill et al. |
| 5,369,266 A | 11/1994 | Nohda et al. |
| 5,371,761 A | 12/1994 | Daffara et al. |
| 5,375,140 A | 12/1994 | Bustamante et al. |
| 5,406,551 A | 4/1995 | Saito et al. |
| 5,412,687 A | 5/1995 | Sutton et al. |
| 5,444,697 A | 8/1995 | Leung et al. |
| 5,446,736 A | 8/1995 | Gleeson et al. |
| 5,471,464 A | 11/1995 | Ikeda |
| 5,487,069 A | 1/1996 | O'Sullivan et al. |
| 5,488,632 A | 1/1996 | Mason et al. |
| 5,490,153 A | 2/1996 | Gregg et al. |
| 5,506,836 A | 4/1996 | Ikeda et al. |
| 5,530,812 A | 6/1996 | Kim et al. |
| 5,537,396 A | 7/1996 | Kanda et al. |
| 5,541,965 A | 7/1996 | Daffara |
| 5,572,528 A | 11/1996 | Shuen |
| 5,583,859 A | 12/1996 | Feldmeier |
| 5,602,835 A | 2/1997 | Seki et al. |
| 5,608,764 A | 3/1997 | Sugita et al. |
| 5,636,247 A | 6/1997 | Kamerman et al. |
| 5,648,958 A | 7/1997 | Counterman |
| 5,652,772 A | 7/1997 | Isaksson et al. |
| 5,675,572 A | 10/1997 | Hidejima et al. |
| 5,682,266 A | 10/1997 | Meyers |
| 5,682,376 A | 10/1997 | Hayashino et al. |
| 5,684,293 A | 11/1997 | Kessler |
| 5,687,165 A | 11/1997 | Daffara et al. |
| 5,694,389 A | 12/1997 | Seki et al. |
| 5,717,689 A | 2/1998 | Ayanoglu |
| 5,726,973 A | 3/1998 | Isaksson |
| 5,732,113 A | 3/1998 | Schmidt et al. |
| 5,757,766 A | 5/1998 | Sugita |
| 5,764,287 A | 6/1998 | Tatsumi |
| 5,787,080 A | 7/1998 | Hutyalkar et al. |
| 5,787,123 A | 7/1998 | Okada et al. |
| 5,812,523 A | 9/1998 | Isaksson et al. |
| 5,834,761 A | 11/1998 | Okada et al. |
| 5,859,842 A | 1/1999 | Scott |
| 6,014,570 A | 1/2000 | Wong et al. |
| 6,172,970 B1 | 1/2001 | Ling et al. |
| 6,330,452 B1 | 12/2001 | Fattouche et al. |
| 6,856,795 B2 * | 2/2005 | Kandala ................. 455/277.2 |

* cited by examiner

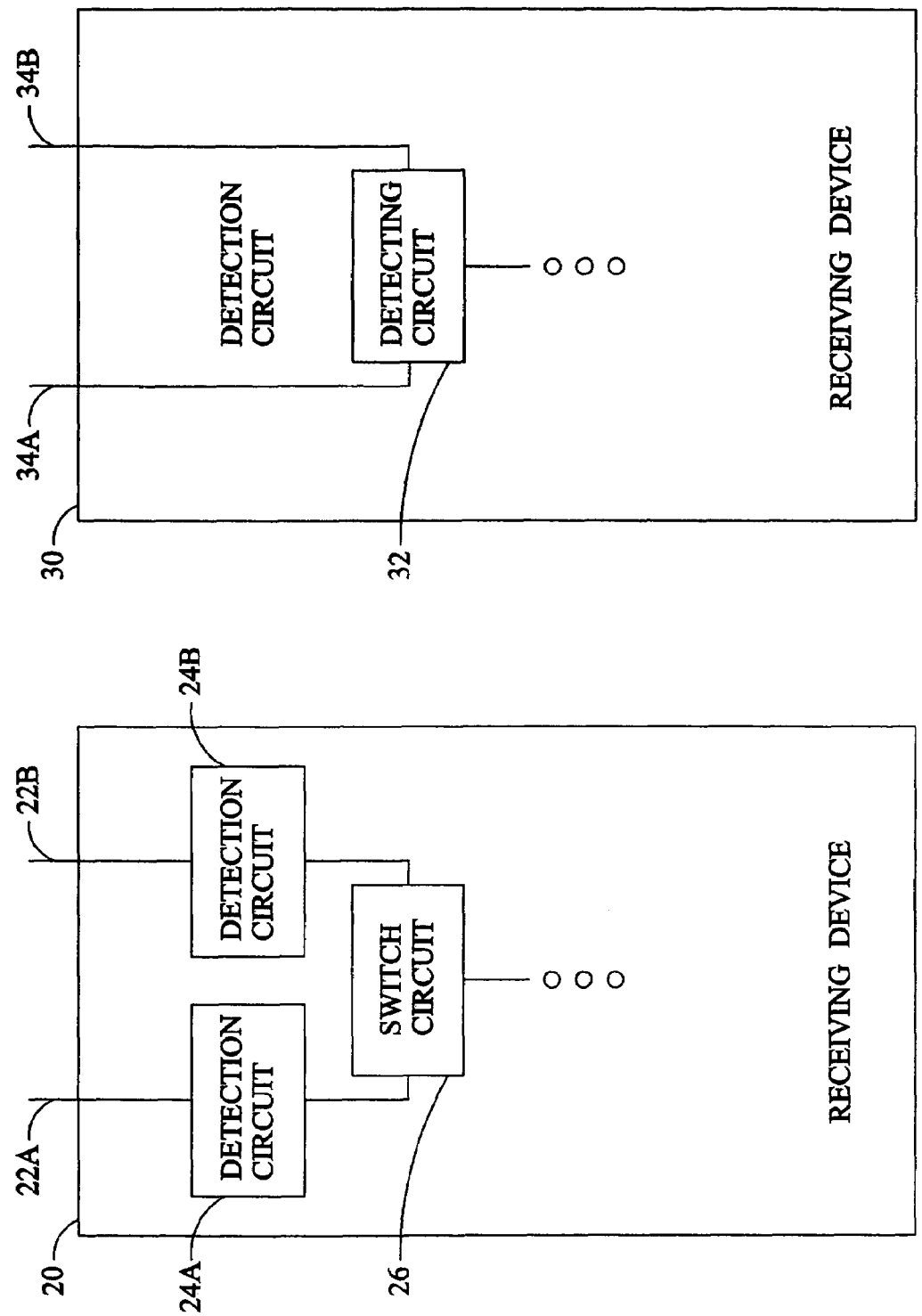

DATA UNIT DETECTION INCLUDING ANTENNA DIVERSITY

CROSS-REFERENCE TO RELATED APPLICATIONS

This application is a continuation of U.S. patent application Ser. No. 10/337,551 filed on Jan. 6, 2003 now U.S. Pat. No. 6,856,795, which is a continuation of U.S. patent application Ser. No. 09/510,907 filed on Feb. 23, 2000, now U.S. Pat. No. 6,505,307, which claims the benefit of U.S. Provisional Patent Application Ser. No. 60/141,419 filed on Jun. 29, 1999.

BACKGROUND OF THE INVENTION

The present invention relates to a communication system including antenna selection diversity.

The Institute of Electrical and Electronic Engineers (IEEE), DRAFT SUPPLEMENT TO STANDARD FOR INFORMATION TECHNOLOGY-TELECOMMUNICATIONS AND INFORMATION EXCHANGE BETWEEN SYSTEMS—LOCAL AND METROPOLITAN AREA NETWORKS—SPECIFIC REQUIREMENTS—PART 11: WIRELESS LAN MEDIUM ACCESS CONTROL (MAC) AND PHYSICAL LAYER (PHY) SPECIFICATIONS: HIGH SPEED PHYSICAL LAYER IN THE 5 GHz BAND, IEEE P802.11A/D7.0, July 1999, is part of a family of standards for wireless Local and Metropolitan Area Networks (hereinafter LAN). The proposed standard specifies certain characteristics of a high speed, digital, wireless communication LAN based on Orthogonal Frequency Division Multiplexing (OFDM) and packet switching, incorporated by reference herein.

In an IEEE 802.11A network, data is transferred in data units that include a header and a data section. The data unit may be any general data structure, sometimes referred to as a packet or frame. The header of each data unit includes a preamble or OFDM training structure comprising a "short training sequence" followed by a "long training sequence." The "long training sequence" comprises two 3.2 µs duration symbols. It is to be understood that symbols may be any type of signal, different durations, different amplitudes, different frequencies, and different characteristics, as desired. The long training sequence is used for channel and fine frequency offset estimation. The short training sequence comprises ten repetitions of a 0.8 µs duration symbol for a total sequence length of 8 µs. During the short training sequence the receiver normally performs signal detection, automatic gain control (AGC), coarse frequency offset determination (CFOD), and timing synchronization. In addition, the receiving device may perform energy determination and antenna diversity selection.

A detection circuit of a receiving device converts an analog radio frequency (R/F) signal received at the antenna to a digital signal and determines whether the received signal is sufficiently strong to be recognizable above the noise in the communication system. The signal detection circuit senses the presence of a signal. The strength of the received R/F signal can vary by orders of magnitude. On the other hand, the analog-to-digital (A/D) signal converter of the detector requires a relatively constant amplitude input signal to avoid clipping and loss of message bits. Typically, an automatic gain control (AGC) circuit controls the amplitude variation of the R/F signal at the input to the A/D converter while the amplitude of the received R/F signal is varying.

The transmitting device and the receiving device each include a clock circuit, normally implemented as an oscillator. In order to synchronize the frequency relationship of the transmitted and received signals, the CFOD circuit synchronizes the frequency of the oscillator in the receiving device to match that of the received signals. In this manner the receiving device adjusts the oscillator to match the actual frequencies of the received symbols. In order to synchronize the temporal relationship of the transmitted and received signals, the timing synchronization circuit synchronizes the temporal relationship of the oscillator in the receiver to match that of the received signals. In this manner the receiving device determines where each symbol actually starts.

With high transmission frequencies, such as in the range of 5-6 GHz, the resulting wavelength of the signal is on the order of five centimeters. With such a short wavelength the receiving device, such as a wireless telephone, may be periodically located in an unsuitable phase relationship with respect to the received signal. In other words, the receiving device may be positioned at a location where the signal is at a minimum making reception difficult, if at all possible. Accordingly, it is preferable to include multiple antennas interconnected to the same receiving device at spaced apart locations. With multiple spaced apart antennas it is likely that at least one antenna will sense a strong signal. Normally the antenna sensing the strongest signal is selected to receive the following data unit.

Referring to FIG. 1, one possible receiving device 20 includes a pair of spaced apart antennas 22a and 22b. Each of the antennas 22a and 22b is interconnected to a respective detection circuit 24a and 24b. Each of the detection circuits 24a and 24b performs signal detection, automatic gain control (AGC), energy determination, coarse frequency offset determination (CFOD), and timing synchronization. The energy determination determines which antenna 22a, 22b senses the strongest signal, normally using a correlator, and accordingly a switch circuit 26 selects the antenna 22a, 22b with the strongest signal to receive the following data unit. Unfortunately, including a pair of detection circuits 24a, 24b within the receiving device 20 consumes twice the power of a single detection circuit and increases the expense of the receiving device 20.

What is desired, therefore, is a receiving device that includes antenna diversity with a single detection circuit, especially a receiving device suitable for a P802.11A.

BRIEF SUMMARY OF THE INVENTION

The present invention overcomes the aforementioned drawbacks of the prior art by providing a system for adjusting a receiving device in response to sensing symbols. An automatic gain control is adjusted in response receiving a first symbol of a data unit from a first antenna. After adjusting the automatic gain control at least a second and a third symbol of the data unit are received, and in response thereto (1) a first energy of at least one of the second and third symbols is calculated, (2) a first frequency offset of at least one of the second and third symbols is calculated, and (3) a first temporal offset of at least one of the second and third symbols is calculated. The automatic gain control in response receiving a fourth symbol of the data unit from a second antenna is calculated. After adjusting the automatic gain control at least a fifth and a sixth symbol of the data unit is received, and in response thereto (1) a second energy of at least one of the fifth and sixth symbols is calculated, (2) a second frequency offset of at least one of the fifth and sixth symbols is calculated, and (3) a second temporal offset of at least one of the fifth and sixth symbols is calculated. At least one of the first and second antenna is selected based upon a comparison between the first and second energy. In this manner, antenna diversity selection may be performed within a limited duration of available symbols.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 is a schematic illustration of a receiving device including two detection circuits.

FIG. 2 is a schematic illustration of a receiving device including one detecting circuit.

DETAILED DESCRIPTION OF THE PREFERRED EMBODIMENT

Figure 3:
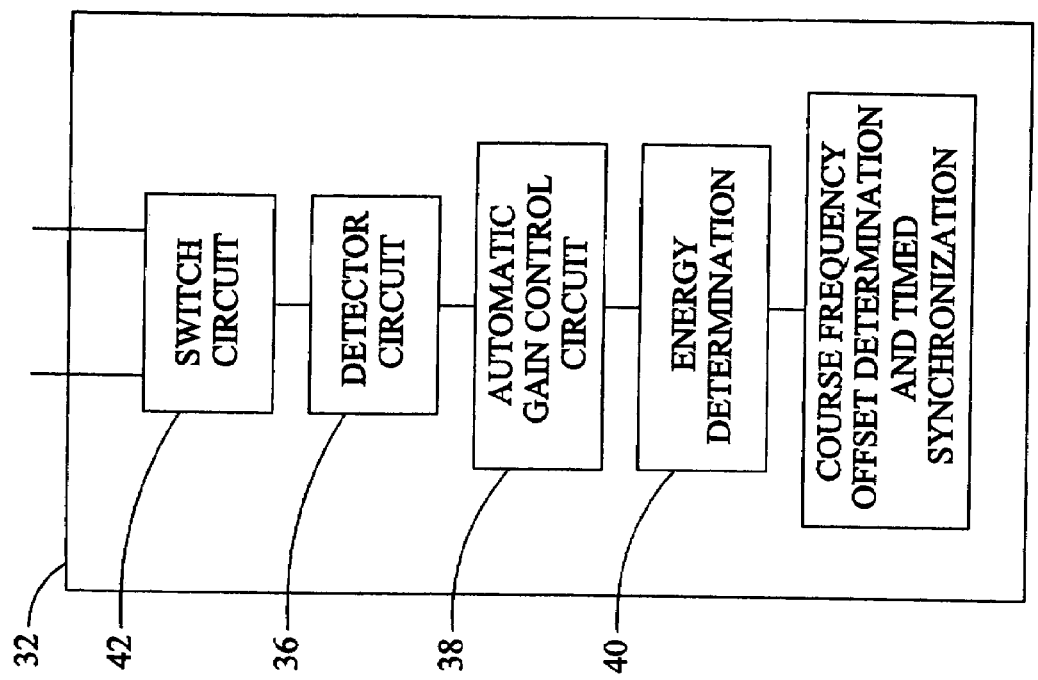
FIG. 3 is a simplified block diagram of a detecting circuit.
Figure 4:
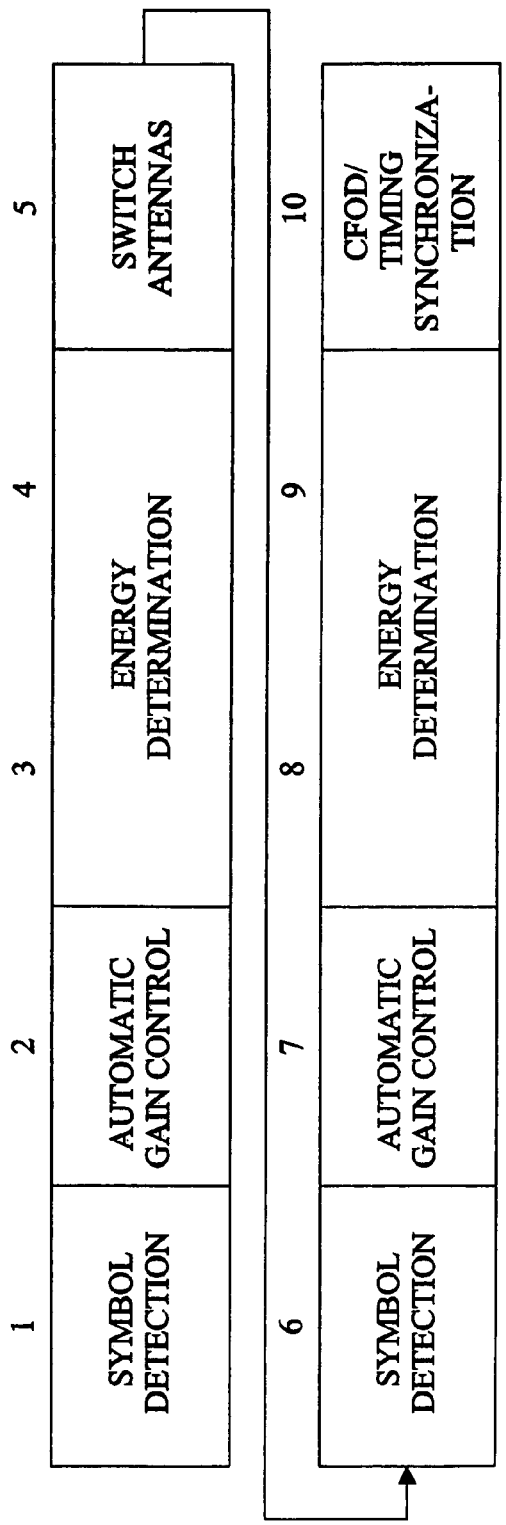
FIG. 4 is a timing diagram for receiving a training sequence.

Referring to FIG. 2, a receiving device 30 includes one detecting circuit 32 switched between two or more spaced apart antennas 34a, 34b. In this manner the receiving device 30 only requires a single detecting circuit 32 thereby reducing power consumption and expense. The P802.11A standard requires the determination of many parameters with the ten short symbols provided during the short training sequence. Referring also to FIGS. 3 and 4, the first symbol is sensed by a detector circuit 36 of the detecting circuit 32 from one of the antennas 32a, 32b to sense a data unit. The second symbol sensed by the detector circuit 36 is used by the AGC circuit 38, as previously described. The AGC circuit 38 may require one or more symbols. The third and fourth symbols sensed by the detector circuit 36 are used by the energy determination circuit 40 to measure the signal strength. Next, a switch circuit 42 switches to the other antenna 32a, 32b during the fifth symbol. The sixth symbol is then sensed by the detector circuit 36. The seventh symbol sensed by the detector circuit 36 is used by the AGC circuit 38. The eighth and ninth symbols sensed by the detector circuit 36 are used by the energy determination circuit 40 to measure the signal strength of the other antenna 32a, 32b. In this manner, the antenna 32a, 32b with the strongest signal is determined for further receipt of the data unit. The selection of the proper antenna 32a, 32b decreases the data unit loss rate, decreases the total transmission delay, and increases the system throughput.

The tenth symbol would then need to be used to perform CFOD and timing synchronization in order to determine the necessary calculations with the short training sequence of ten symbols. Unfortunately, it is not possible to perform either the CFOD nor the timing synchronization with a single symbol. In addition, if the other antenna 32a, 32b has the weaker energy then a symbol duration is required to switch back to the first antenna 32a, 32b from which to receive the remaining symbols. Unfortunately, no additional symbols are available during the short training sequence from which to determine CFOD and timing synchronization if the tenth symbol is used for switching. Also, most systems switch between the antennas 32a, 32b periodically so the first symbol of the short training sequence may arrive during the switching time. Accordingly, the first symbol detected may be the second or later symbol. Similarly, this limits the available symbols within the short training sequence from which to determine the necessary parameters.

After consideration of the typical implementations of antenna diversity, one would come to the realization that the designers of the P802.11A standard did not consider the number of symbols necessary during the short training sequence for antenna diversity using a single detector circuit. The apparent solution is to use multiple detection circuits, one for each antenna 32a, 32b, or otherwise do not implement antenna diversity.

One event that can result in a loss of a data unit is a false alarm. A false alarm occurs when the presence of a signal is "detected" even though there is no actual signal. A false alarm usually sets the detecting circuit into a "busy" mode and starts a sequence of functions (decoding). As this sequence of functions is being performed by the detecting circuit, the detecting circuit may determine that there has been a false alarm and revert back to a "standby" mode. If the detecting circuit has received no data units during the period in which the receiving device is in the "busy" mode, then there will not be any lost data units as a result of the false alarm. However, if a data unit has been received during the "busy" mode, the detecting circuit might allow the data unit to go undetected thereby contributing to the loss of a data unit. It may be observed that a false alarm potentially contributes to the loss of a data unit if the detecting circuit goes into a mode where no further symbol detection is performed or when the detecting circuit assumes that the long symbol will follow exactly after 10 short symbols. In contrast, the present inventor determined that the detecting circuit should perform continuous monitoring of the channel which will decrease the impact of false alarms. Also, the long symbol transition should be detected independently of the number of short symbols that are detected to further avoid any cost associated with the "busy" mode that originates due to the false alarm. In this manner, the detecting circuit does not need to actually count, or otherwise keep track of, the number of short symbols of the short training sequence. If the long symbol transition goes undetected, then the situation simply becomes another missed data unit detection. With this modification of the detecting circuit the effects of false alarms can be minimized, especially in a receiving device with a short training sequence having a limited number of symbols.

Disregarding the effects of a false alarm, a data unit is considered lost if the detection of the data unit is missed or if the data unit contains unrecoverable errors. Thus, the probability of a lost data unit may be represented as (one antenna):

$$Pr[\text{a data unit loss}] = P_M + (1 - P_M) Pr[\text{Frame in error|Frame is detected}] \quad (1)$$

where $P_M$ is the probability of a missed detection. The probability, Pr[Frame in Error|Frame is detected], depends on the channel, convolutional coding, and the interleaver.

A missed detection is considered to occur when the presence of the symbols of the short training sequence are, for example, (1) not detected, (2) not detected early enough so that the necessary functions can be performed with the short symbols received, (3) or when the transition to the long symbols is not detected.

The functions that should be performed during the short symbol reception (either directly or on a buffered signal) are the symbol detection, the AGC, the switching, the diversity selection if there are multiple antennas (energy determination), the CFOD, and the timing synchronization. The CFOD and the timing synchronization can only be reasonably performed after the establishment of the AGC. Thus, it is important that the AGC be determined prior to CFOD and timing synchronization. At least two short symbol durations are required to perform CFOD and timing synchronization. Under the assumption that AGC can be performed in one short symbol, while using one antenna, the detecting circuit needs to be able to detect the signal within at least seven short symbols (10 total symbols−[AGC(one symbol)+(CFOD+TS) (two symbols)]. Assuming a nominal operating signal-to-noise (S/N) ratio of 8 dB in an Additive White Guassian Noise (AWGN) channel, the probability of a missed detection during a short symbol is about $10^{-4}$, while in a flat-fading Rayleigh channel, it is about $10^{-2}$. Since there are at least 7 short symbols during which the signal needs to be detected, the probability of a missed detection during short symbol is $10^{-28}$ in the AWGN channel and $10^{-14}$ in a flat fading channel. Even when the gain adjustment is increased to three (presuming AGC takes three symbols to perform) short symbols, the worst-case scenario of the probability of a missed detection is $10^{-10}$. Thus, the first term in equation (1) above can be neglected and hence a missed detection is very unlikely to occur in the case of a single antenna and thus can be effectively disregarded.

For the case of multiple antennas, equation (1) may be modified to the following (equation 2):

$$\Pr[\text{a data unit lost}] = \Pr[\text{missed detection on both antennas}] +$$
$$\Pr[\text{antenna 1 is used for detection}]$$
$$\Pr[\text{frame in error} \mid \text{antenna 1 is used for detection}] +$$
$$\Pr[\text{antenna 2 is used for detection}]$$
$$\Pr[\text{frame in error} \mid \text{antenna 2 is used for detection}]$$

Note that in equation (2) the last two terms on the right hand side consider the situation in which the signal is detected by only one antenna at a time. Equation (2) disregards the effects of false alarms because false alarms are highly unlikely in view of the aforementioned detecting circuit modification. The first term of equation (2) is analogous to the first term in equation (1). As before, a data unit is deemed missed when the presence of the symbols of the short training sequence are, for example, (1) not detected, (2) not detected early enough so that the necessary functions can be performed with the reception of the short symbols, (3) or when the transition to the long symbols is not detected. In order to minimize the probability of a miss, the functions that need to be performed during the reception of the short symbols should be done in a timely manner. When the receiver is in a standby mode, the receiver will alternate between the two antennas with signal collection on each antenna normally lasting for the duration of one short symbol. This also means that the receiver should wait for one short symbol before it starts detecting the signal (and get ready to perform the associated functions). When a symbol is detected, the receiver needs to as before, three to five symbols to establish the signal (switch, detect, AGC, CFOD, and time synchronization). In either case, there are at least five symbols during which the presence of the signal needs to be detected. Thus, the probability of a miss by two antennas is the same as for one antenna (nearly zero) and may be disregarded. Also, the first multiplicative term in the second additive term in equation (2) (as well as the first multiplicative term in the third additive term) depends on the signal level on the antenna with respect to the signal level on the other antenna and/or the time line. In essence, the antenna with the greatest energy level is selected.

With the establishment that missed detections and false alarms are unlikely, and in general can be disregarded, the present inventor established the requirements desirable for antenna selection diversity with two (or more) antennas. A pair of symbols are typically used for the detection of the presence of the signal (optional), namely, one symbol (or more) for the first antenna and another symbol (or more) for the second antenna. Also, a pair of symbols are used for AGC adjustment, namely one symbol (or more) for the first antenna and another symbol (or more) for the second antenna. In addition, a pair of symbols (or more) for each antenna are used for energy determination. One symbol (or more) is normally used for the switching from one antenna to another. Thus at least nine symbols are needed, namely, for detection (two), for AGC (two), for energy determination (four), and for switching (one). This only leaves one additional symbol which the present inventors determined is not sufficient to perform the CFOD or the timing synchronization, as previously described. The additional symbol is useful in the event of switching during the first symbol. Unfortunately, at least two symbols (or more) for each antenna are used for CFOD and timing synchronization, namely, two symbols for the first antenna and two symbols for the second antenna.

Figure 5:
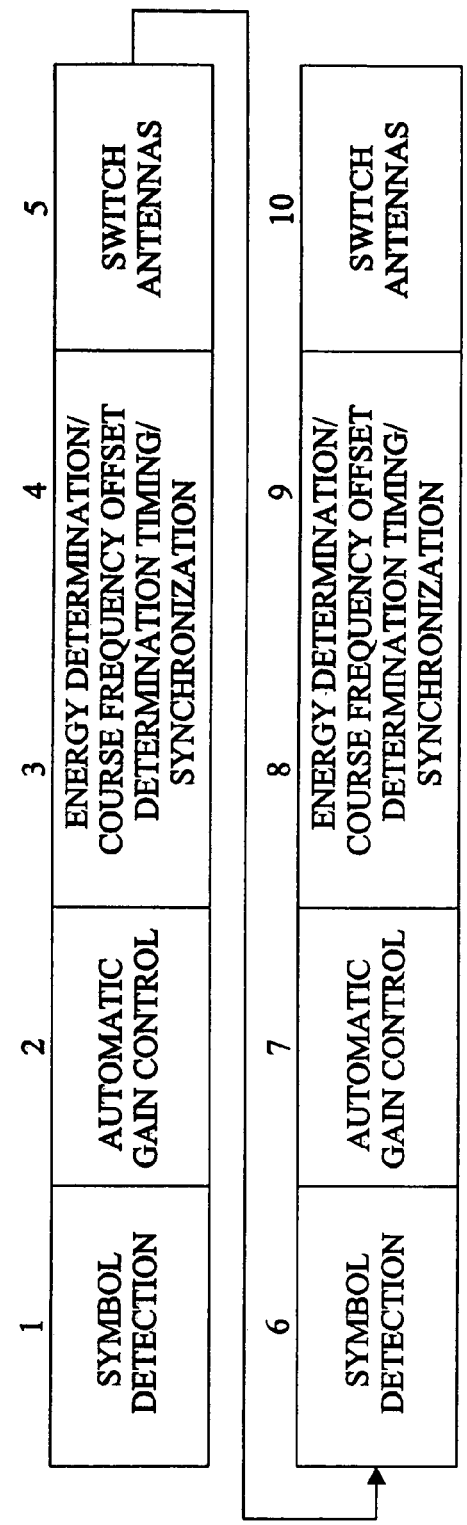
FIG. 5 is an exemplary timing diagram of receiving a training sequence in accordance with the present invention.

After consideration of the aforementioned timing requirements together with the present inventor's realization of the unlikeliness of false alarms with continuous monitoring and the extremely low probability of missing a data unit, the present inventor came to the further realization that the CFOD and the timing synchronization may be performed once for each antenna together with the energy determination to alleviate the restrictions imposed by the ten symbols of the short training sequence. Referring to FIG. 5, the preferred technique includes symbol detection by a first antenna, AGC, then the combination of energy determination, CFOD, and timing synchronization. Then the system switches to a second antenna during the subsequent symbol. Then symbol detection, AGC, then the combination of energy determination, CFOD, and timing synchronization is performed with symbols from the second antenna. The first symbol may be missed if a switch is performed when it is received. The number of short symbols used with the technique of FIG. 5 is nine short symbols, which is less than the ten symbols available. In addition, if the first symbol is missed, then only nine short symbols are used which is still permitted by the P802.11A standard. If necessary, the antenna may be switched to the first antenna if it has greater energy during the last symbol or after the short training sequence. It is to be understood that the determination of the parameters may likewise be performed on buffered signals, if desired, so the order of calculation may differ somewhat. In addition, the symbol detection is optional. Also, the detection and/or determination of the parameters may be done between the symbols, if desired.

Figure 6:
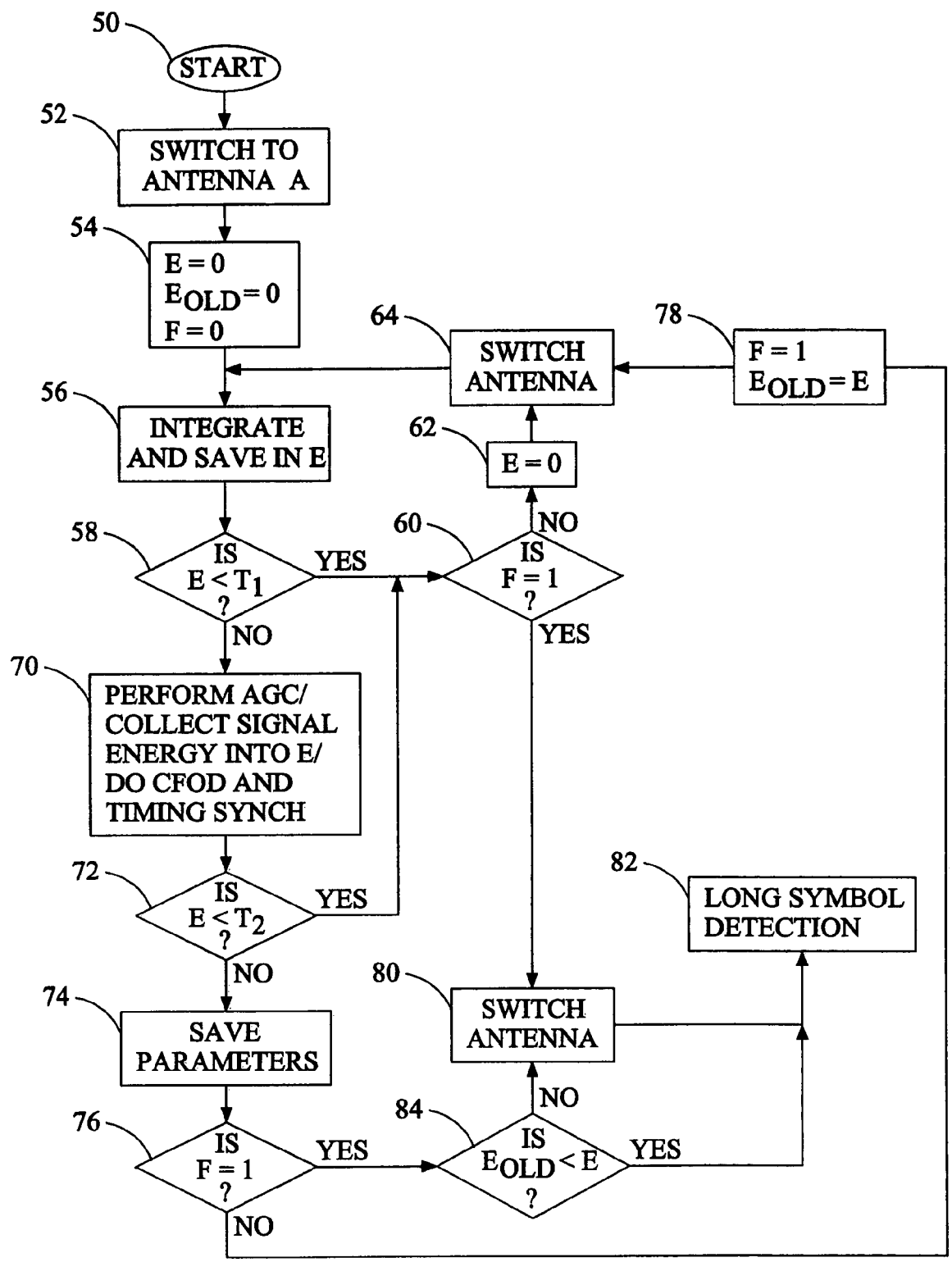
FIG. 6 is an exemplary flowchart for the training sequence of FIG. 5.

Referring to FIG. 6, a flowchart for implementing the preferred technique includes starting at block 50. Block 52 switches to antenna A. Block 54 sets variables E=0, $E_{old}$=0, and F=0. E represents the energy detected by the currently selected antenna. $E_{old}$ represents the energy detected by the previously selected antenna. F is a flag. Block 56 integrates any energy received on the selected antenna (antenna A) during a short symbol duration and stores the result in E. In other words, block 56 senses the presence of a symbol and some measure of its energy. Block 58 determines if the received energy in E is less than a first threshold T1. If E is less than T1 then block 60 determines if the flag F is 1. If the flag F is not one, then E is set to 0 by block 62 and block 64 switches to the other antenna. Setting E to 0 reinitializes the energy detected back to zero. The loop of blocks 56, 58, 60, 62, and 64 alternatively switch between the antennas until sufficient energy is detected indicating a valid data unit at block 58 by E not being less than T1.

When sufficient energy is detected control is passed from block 58 to block 70 which performs AGC, then collects the signal energy into E, determines the CFOD, and determines the timing synchronization. Block 72 determines if E is less than a second threshold T2, which if true, then the system branches to block 60. If F is not equal to 1 then E is set to zero and the antenna is switched at block 64. This is representative of receiving noise or simply insufficient energy to process the rest of the data unit. If block 72 determines that E is not less than a second threshold T2, then the system saves the parameters, AGC, E, CFOD, and timing synchronization, at block 74. Block 76 checks to see if F is equal to 1, which if not true, then control is passed to block 78. Block 78 sets F equal to 1 and $E_{old}$ equal to E. Setting F equal to 1 indicates that a first set of symbols from a first antenna has been processed having a sufficient energy and that the other antenna should now be checked. Setting $E_{old}$ equal to E saves the energy determined from the first antenna so that it may be later compared again the energy for the other antenna.

Now that the system has detected a set of symbols with sufficient energy on the first antenna, the system will check the other antenna. Block 64 switches to the other antenna and block 56 integrates and saves the resulting value in E. If E (for the other antenna) is less than threshold T1 then block 58 branches to block 60, which in turn branches to block 80. This result indicates that no valid signal was detected on the other antenna. Block 80 switches back to the first antenna which had a valid set of detected symbols. Control is then passed to block 82 for the detection of the subsequent long symbol detection.

If E (for the other antenna) is not less than the threshold T1 then block 58 branches to block 70, which performs AGC, energy determination, CFOD, and timing synchronization. If E is less than threshold T2 then insufficient energy was detected for the other antenna and control is passed to block 60. Block 60 then passes control (F=1) to block 80 which switches to the first antenna with the valid data and passes control to block 82 which does long symbol detection. This represents valid data for the first antenna while the data is not sufficient for the other antenna. Accordingly, the first antenna is used for the subsequent data unit.

If E (for the other antenna) is not less than T2 then the parameters, AGC, E, CFOD, and timing synchronization, are saved at block 74 (not over writing the parameters from the first antenna). Block 76 passes control (F=1) to block 84 which determines which antenna has the greater energy. If the currently selected antenna (other antenna) has the greatest energy then control is passed to block 82. If the currently selected antenna (other antenna) does not have the greatest energy then control is passed to block 80 to switch to the first antenna and subsequently to block 82. In this manner the antenna with the greatest energy is selected, all of which is performed within 10 short symbols, or otherwise before valid data is received from the long training sequence.

It is to be understood that the aforementioned techniques may likewise be applied to any other communication system.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method of adjusting a receiving device in response to sensing symbols comprising:
    (a) adjusting an automatic gain control in response receiving a first symbol of a data unit from a first antenna;
    (b) after adjusting said automatic gain control receiving at least a second and a third symbol of said data unit and in response thereto (1) calculating a first energy of at least one of said second and third symbol, (2) calculating a first frequency offset of at least one of said second and third symbol, and (3) calculating a first temporal offset of at least one of said second and third symbol;
    (c) adjusting said automatic gain control in response receiving a fourth symbol of said data unit from a second antenna;
    (d) after adjusting said automatic gain control receiving at least a fifth and a sixth symbol of said data unit and in response thereto (1) calculating a second energy of at least one of said fifth and sixth symbol, (2) calculating a second frequency offset of at least one of said fifth and sixth symbol, and (3) calculating a second temporal offset of at least one of said fifth and sixth symbol; and
    (e) selecting at least one of said first and second antenna based upon a function of said first and second energy.

2. The method of claim 1 wherein said automatic gain control is a single automatic gain control circuit.

3. The method of claim 1 wherein said first, second, third, fourth, and fifth symbols are in a non-sequential order.

4. The method of claim 1 wherein said automatic gain control adjusts the amplitude variation of the received symbols at the input to an analog-to-digital converter.

5. The method of claim 1 wherein said first frequency offset and said second frequency offsets are coarse offset frequency determinations.

6. The method of claim 1 wherein said first temporal offset and said second temporal offset are timing synchronization.

7. The method of claim 1 wherein said comparison between said first and second energy is a magnitude determination.

8. The method of claim 1 further comprising sensing an initial symbol from said first antenna prior to said first symbol.

9. The method of claim 8 further comprising sensing an intermediate symbol from said second antenna prior to sensing said fourth symbol and after sensing said third symbol.

10. The method of claim 9 further comprising switching from said first antenna to said second antenna prior to receiving said fourth symbol and after receiving said first symbol.

11. The method of claim 10 wherein said switching occurs during one symbol duration.

12. The method of claim 10 wherein said first symbol, said second symbol, said third symbol, said fourth symbol, said fifth symbol, said sixth symbol, said switching, said initial symbol, and said intermediate symbol occurs within a time duration of nine symbols.

13. The method of claim 12 further comprising switching from said second antenna to said first antenna after receiving said sixth symbol and no later than a tenth symbol of said data unit.

14. The method of claim 8 wherein said sixth symbol is received no later than a tenth symbol of said data unit.

15. The method of claim 9 wherein said sixth symbol is received no later than a tenth symbol of said data unit.

16. The method of claim 10 wherein said sixth symbol is received no later than a tenth symbol of said data unit.

17. The method of claim 12 wherein said sixth symbol is received no later than a tenth symbol of said data unit.

* * * * *